United States Patent [19]

Bhat et al.

[11] Patent Number: 5,034,022

[45] Date of Patent: * Jul. 23, 1991

[54] SILICON NITRIDE CUTTING TOOL

[75] Inventors: Deepak Bhat, Troy; Dhirajlal Shah, Sterling Heights, both of Mich.

[73] Assignee: GTE Valenite Corporation, Troy, Mich.

[*] Notice: The portion of the term of this patent subsequent to Nov. 21, 2006 has been disclaimed.

[21] Appl. No.: 409,189

[22] Filed: Sep. 19, 1989

Related U.S. Application Data

[63] Continuation of Ser. No. 104,695, Oct. 5, 1987, Pat. No. 4,881,950, which is a continuation-in-part of Ser. No. 868,466, May 30, 1986.

[51] Int. Cl.$^5$ .............................................. B24B 1/00
[52] U.S. Cl. ............................... 51/307; 51/308; 51/309
[58] Field of Search .................. 51/295, 307, 308, 309

[56] References Cited

U.S. PATENT DOCUMENTS

| | | | |
|---|---|---|---|
| 4,406,667 | 9/1983 | Sarin et al. | 51/295 |
| 4,406,668 | 9/1983 | Sarin et al. | 51/295 |
| 4,406,669 | 9/1983 | Sarin et al. | 51/295 |
| 4,406,670 | 9/1983 | Sarin et al. | 51/295 |
| 4,409,003 | 10/1983 | Sarin et al. | 51/295 |
| 4,409,004 | 11/1983 | Sarin et al. | 51/295 |
| 4,416,670 | 11/1983 | Sarin et al. | 51/295 |
| 4,421,525 | 12/1983 | Sarin et al. | 51/295 |
| 4,424,066 | 1/1984 | Sarin et al. | 51/295 |
| 4,426,209 | 1/1984 | Sarin et al. | 51/295 |
| 4,431,431 | 2/1984 | Sarin et al. | 51/295 |
| 4,440,707 | 4/1984 | Shimamori et al. | 264/65 |
| 4,441,894 | 4/1984 | Sarin et al. | 51/295 |
| 4,449,989 | 5/1984 | Sarin et al. | 51/295 |
| 4,469,489 | 9/1984 | Sarin et al. | 51/295 |
| 4,539,251 | 9/1985 | Sugisawa et al. | 428/216 |
| 4,629,661 | 12/1986 | Hillert et al. | 428/698 |
| 4,640,693 | 2/1987 | Bhat et al. | 51/295 |
| 4,705,761 | 11/1987 | Kosui | 501/87 |

FOREIGN PATENT DOCUMENTS

| | | | |
|---|---|---|---|
| 0087888 | 9/1983 | European Pat. Off. . | |
| 0124989 | 11/1984 | European Pat. Off. . | |
| 3414979 | 10/1984 | Fed. Rep. of Germany . | |
| 3423911 | 1/1985 | Fed. Rep. of Germany . | |
| 3514320 | 11/1985 | Fed. Rep. of Germany | 428/698 |
| 3509572 | 7/1986 | Fed. Rep. of Germany | 428/701 |
| 56-32377 | 4/1981 | Japan . | |
| 59-73472 | 4/1984 | Japan . | |
| 60-145961 | 8/1985 | Japan | 501/97 |
| 2157282 | 10/1985 | United Kingdom | 501/98 |
| 85/00588 | 2/1985 | World Int. Prop. O. | 501/97 |

*Primary Examiner*—William R. Dixon, Jr.
*Assistant Examiner*—Willie J. Thompson
*Attorney, Agent, or Firm*—Bill C. Panagos; Robert E. Walter

[57] ABSTRACT

A coated densified ceramic cutting tool has a granular phase of silicon nitride, silicon aluminum oxynitride, and a reaction formed submicron refractory metal nitride uniformly distributed in a matrix of a suitable densification aid with a coating comprising an interfacial layer of titanium nitride followed by at least one layer of refractory metal material.

7 Claims, No Drawings

SILICON NITRIDE CUTTING TOOL

This application is a continuation of application Ser. No. 104,695 filed 10-5-87, U.S. Pat. No. 4,881,950 which is a continuation-in-part of pending application Ser. No. 06/868,466 filed May 30, 1986.

FIELD OF THE INVENTION

The invention relates to ceramic cutting tools and cutting tool inserts. More particularly it is concerned with densified silicon nitride cutting tools.

BACKGROUND OF THE INVENTION

Advances in metal working equipment manufacture, and economic necessities of higher productivity have combined to put greater demands of improved performance on cutting tool materials. At higher cutting speeds, the chemical inertness of a cemented carbide tool as well as its strength are compromised due to higher temperatures generated from high speed machining. Even with coatings of refractory compounds such as aluminum oxide, the cemented carbide cutting tools have reached the useful limit due to thermal deformation of the tool tip, resulting in poor machining performance and tool life.

Conventional ceramic cutting tools such as aluminum oxide, aluminum oxide/titanium carbide composites and the like overcome many of these problems because of their superior thermal deformation resistance. They, however, suffer from low impact strength and fracture toughness. Silicon nitride based cutting tool materials are found to have superior fracture toughness compared to alumina based cutting tools, but show lower chemical wear resistance when cutting steel.

In an effort to obtain the improved fracture toughness and chemical wear resistance desirable, silicon nitride based cutting tools have been coated with carbides, nitrides and carbonitrides of titanium, hafnium, and zirconium, as well as with aluminum oxide.

SUMMARY OF THE INVENTION

When coating a silicon nitride substrate by chemical vapor deposition technique at high temperatures, considerable stress is developed due to thermal expansion mismatch between the coating and substrate making it difficult to consistently achieve strongly adherent coatings.

The present invention is directed to a substrate which may be used as a tool or an intermediate product to provide a substrate which aids the adherence of coatings. A process for producing the substrate and coated tools is also described.

In accordance with the present invention, there is provided a densified ceramic cutting tool comprising a substrate body having a granular phase consisting essentially of silicon nitride and silicon aluminum oxynitride. The granular phase is uniformly distributed in an granular or matrix phase of a suitable densification aid. An additional submicron phase is present in the matrix phase and consists of a refractory metal nitride. Both the silicon aluminum oxynitride and the refractory metal nitride are formed during the densification of the tool.

According to the process of the present invention, the above mentioned sintered ceramic cutting tool is produced from a powder mixture consisting essentially of silicon nitride for forming a portion of the granular phase, a refractory metal oxide capable of reacting with silicon nitride during sintering to form a refractory metal nitride and a reaction formed silicon oxide. Additional components of the powder are capable of reacting with the silicon nitride and the reaction formed silicon oxide to produce the remaining portion of the granular phase which consists essentially of a silicon aluminum oxynitride. The powder mixture also includes a densification aid capable of being densified at a suitable temperature.

Also, in accordance with the present invention, there is provided a tool comprising the above mentioned substrate which is coated with an oxide, carbide, or nitride of a refractory metal, or suitable combinations thereof.

DETAILED DESCRIPTION

The substrate body of the cutting tool of the present invention possesses a micro-structure comprising a granular phase and an granular matrix phase. The granular phase consists essentially of silicon nitride and a silicon aluminum oxynitride. Silicon nitride may be present in either the alpha or beta form depending on the starting powder used and the densification process utilized. Densification at high temperatures and pressures tend to favor the conversion of alpha-silicon nitride to beta-silicon nitride. Typically, the simultaneous application of heat and pressure tends to favor the formation of beta-silicon nitride while cold pressing and sintering favors retention of a part of the original alpha-silicon nitride phase.

The silicon aluminum oxynitride portion of the granular phase consists of one or more phases corresponding to the formula $Si_{6-x}Al_xO_xN_{8-x}$ where x is greater than 0 and less than or equal to 4.2. To obtain improved toughness with the tools of the present invention, it is preferable that x be from about 0 to about 2.0. Silicon aluminum oxynitride is formed during densification by the reaction of constituents initially present in the starting powder or formed during densification. Thus, the amount of reaction formed silicon aluminum oxynitride depends on the amount of reactants available. Preferably silicon aluminum oxynitride phase is present in an amount by weight from about 5 to about 90 percent. More preferably from about 5 to about 75 percent by weight of the substrate body. Unless otherwise indicated, all weight percents set forth herein are based on the weight of the substrate body.

The primary constituent of the granular matrix phase is a densification aid which permits densification to densities approaching theoretical and at the same time does not deleteriously affect the high temperature strength and creep resistance of the overall composite. Typical densification aids useful for this purpose are non-reactive metal oxides selected from the group consisting of magnesium oxide, yttrium oxide, the lanthanide rare earth oxides, and mixtures thereof. Yttrium oxide is a preferred densification aid. Preferably the metal oxide densification aid is employed in an amount to about 3 to about 25 weight percent of the substrate body. More preferably the densification aid is present in an amount from about 4 to about 18, and most preferably from about 5 to about 12 percent by weight.

As an intentional constituent, the matrix phase includes an additional submicron phase consisting of a refractory metal nitride which is formed during the sintering process. Typical refractory metal nitrides are the nitrides of hafnium, zirconium, vanadium, tantalum, niobium, and titanium. The preferred metal nitrides are the nitrides of vanadium, tantalum, niobium and titanium with the most preferred nitride being titanium nitride. It is theorized that the fine submicron metal nitride phase uniformly dispersed throughout the substrate enhances the strength of the cutting tool of the present invention. When the metal nitride is titanium nitride, it is theorized that an additional enhancement of thermal conductivity is achieved so as to reduce the likelihood of tool failure and of thermal mismatches. Certain impurities and additives present in the overall composite substrate body tend to concentrate in the granular phase during the densification process. Intentional ingredients include non-reacted silicon oxide, aluminum oxide and aluminum nitride. Such further additional materials are preferably present in amounts less than about 5 percent, and more preferably less than about 2 percent by weight of the substrate body. Preferably the metal nitride comprises from about 1 percent to about 40 percent weight percent of said cutting tool and more preferably from about 1 percent to about 15 percent weight percent.

Both the silicon aluminum oxynitride and the refractory metal nitride are formed during densification process of the tool by a chemical reaction from reactants present in the starting powder or generated during the densification process.

According to the process of the present invention, the cutting tool of the present invention is formed by densifying a powder mixture. A preferable mixture comprises from about 30 percent to about 95 percent by weight silicon nitride and preferably from about 45 percent to about 85 percent by weight. The starting powder preferably includes alpha-silicon nitride powder at least in the minimum amounts previously described. During the densification process, a portion of the silicon nitride reacts with a refractory metal oxide to form a refractory metal nitride and silicon oxide. The reaction formed refractory metal nitride is of a submicron size and tends to concentrate around the grain boundaries of the granular phase. Preferably the powder mixture comprises from about 1 percent to about 40 percent by weight refractory metal oxide. When the metal oxide is titanium oxide, the mixture preferably comprises from about 1 percent to about 15 percent by weight.

Typical reactions of the refractory metal oxides with silicon nitride include the reaction of $HfO_2$, $ZrO_2$, $Ta_2O_5$, $Nb_2O_5$, $NbO_2$, $TiO_2$, or $Ti_3O_5$ with $Si_3N_4$ to form the respective nitride, $SiO_2$ and nitrogen gas. In these reactions the refractory metal oxides and nitrides are solids.

The powder mixture includes additional components capable of reacting with silicon nitride and the reaction formed silicon oxide to produce the silicon aluminum oxynitride portion of the granular phase. The additional components comprise aluminum nitride, aluminum oxide, and silicon oxide. Preferably aluminum nitride is present in an amount from about 1 percent to about 40 weight percent of the powder mixture and more preferably from about 1 percent to about 30 percent weight percent. Aluminum oxide is preferably present from about 0 percent to about 50 percent, and more preferably from about 0 percent to about 20 percent by weight. Silicon oxide is preferably present from about 0 percent to about 20 percent weight percent of the powder mixture and more preferably from about 1 percent to about 15 percent weight percent. By employing starting mixtures containing varying proportions of silicon nitride, aluminum nitride and silica, it is possible to produce materials in which the entire ceramic phase is silicon aluminum oxynitride of x value greater than 0 and less than or equal to 4.2, thus, it should be understood that the x value increases progressively up to 4.2 as the aluminum nitride content of the starting mixture is increased up to about 30 percent by weight, while at the same time the silica content is increased to approximately 25 percent by weight and the silicon nitride content is decreased to approximately 45 percent by weight. It should also be kept in mind that a portion of the silicon oxide available is formed by the reaction of the metal oxide with silicon nitride.

The powder mixture additionally includes an additional amount for suitable densification aid which forms the primary constituent of the granular phase. Because impurities in additives present in the overall substrate body tend to concentrate in the granular phase during the densification process, the composition of the granular phase profoundly effects the high temperature properties of the densified body.

The metal oxide densification aid is employed in amounts hereinbefore referred to with regard to the final composition of the silicon nitride cutting tool. It is important that the aluminum oxide, aluminum nitride and silicon oxide proportions be adjusted so that the amount of unreacted aluminum oxide, aluminum nitride and silicon oxide does not exceed about 5 percent by weight of the matrix phase.

The starting powder as described above employed in the preparation of the ceramic substrate body of tools in accordance with this invention may include partially crystallized amorphous material, a mixture of substantially amorphous and substantially crystalline material, or substantially completely crystalline material. The starting material may be processed to a powder compact of adequate strength by thoroughly mixing with any binders or pressing aids which may be employed, for example by ball milling in a non-reactive medium such as toluene or methanol, and subsequently consolidating the mixture by pressing, extruding, or slip-casting. Processing may also optionally include presintering or prereacting step in which either the uncompacted powder or the powder compact is heated at a moderate temperature such as from about 500° C. to about 1000° C. in order to remove any binders and volatile solvents and to partially react the starting materials.

The substrate bodies of cutting tools of this invention can further be made by compacting the above mentioned components to a highly dense article by conventional techniques such as gas-over-pressure sintering, hot pressing, or hot isostatic pressing. Since the strength of the resulting cutting tools decrease with increasing porosity of a compact, it is important that the compact be densified to a density as closely approaching theoretical density as possible.

Homogeneity of the cutting tool material is an extremely important factor for tool performance. During cutting, only a small portion of the cutting tool is exposed to high stress and elevated temperatures. The temperature induced changes and mechanical properties, which are also compositionally dependent, contribute to fracture and chipping at the tool edge, in turn contributing to the rate of tool wear.

The powder blends employed to starting materials for tool substrates of this invention are densified to a density of at least 98 percent of theoretical by pressing followed by sintering, hot pressing, gas over-pressure sintering, or hot isostatic pressing in a non-oxidizing atmosphere. Temperatures employed for pressing followed by sintering range from about 1600° C. to about 1800° C., preferably from about 1700° C. to about 1800° C. Hot pressing is carried out at pressures greater than about 2000 psig at temperatures ranging from about 1700° C. to about 1900° C.

The following examples are provided to enable one skilled in the art to practice the invention and should not be viewed as limiting the scope of the invention as defined by the appended claims.

EXAMPLE 1

A 92 gram batch of silicon nitride powder was mixed with about 20 grams silicon dioxide powder, about 26 grams titanium dioxide powder, about 54 grams aluminum nitride powder and about 8 grams yttrium oxide as densification aid, along with 500 ml naptha. The mixture was ball milled using 4000 grams of tungsten carbide balls, a low binder grade, in a rubber-lined stainless steel container for 24 hours at 67 rpm speed. After milling, the powder was dried in an oven at about 80° F. for 18 to 24 hours, or until dry. The dry powder mixture was screened through a −30 mesh screen. Paraffin wax, in an amount equal to about 8 weight percent of the weight of dry powder, was melted in an oven at 85° C., and added to the powder mixture at the same temperature. The mixture was mixed in a blender for about 10 minutes. Next, the blended powder mixture was pressed at 36,000 psi to obtain green compacts. The green compacts were hot pressed in a boron-nitride-coated graphite die. The parts were heated to 1200° C. at 2250 psi nitrogen pressure, and the pressure was raised slowly to 4500 psi over a temperature from 1200° C. to 1500° C. The temperature was further raised to 1750° C. and held for 60 minutes. After hot pressing the parts were cooled to room temperature under 4500 psi nitrogen pressure. The density of the hot pressed parts was from about 99 percent to about 100 percent of theoretical.

EXAMPLE 2

The green compacts prepared as in example 1 were gas-over-pressure-sintered using nitrogen at various nitrogen pressures ranging from about 1 psig to about 300 psig, at a temperature of 1745° C. for various times from about 1 hour to about 8 hours, preferably from about 2 hours to about 4 hours. The density of parts ranged from about 99 percent to 100 percent of theoretical.

EXAMPLE 3

Cutting tool inserts were ground from the parts obtained in examples 1 and 2 in the SNG 433 geometry. Machining tests were performed by turning a 4340 steel bar, having a harness of Rc 37-38. The machining conditions were: speed=700 sfm, feed=0.010 ipr, and depth of cut=0.05 inch. The tool life was compared with commercial silicon nitride and sialon grades of cutting tools. The results are shown in the following Table 1.

TABLE 1

| Comparison of performance of tools of present invention with commercial silicon nitride tools. | | |
|---|---|---|
| Tool Type | Tool Life, min. | Type of Failure |
| Hot Pressed (Example 1) | 6.8 | Wear |

TABLE 1-continued

| Comparison of performance of tools of present invention with commercial silicon nitride tools. | | |
|---|---|---|
| Tool Type | Tool Life, min. | Type of Failure |
| O.P. Sintered (Example 2) | 7.9 | Wear |
| Commercial Sialon | 1.3 | Wear |
| Commercial Silicon nitride | 0.7 | Heavy Wear and fracture |

The substrate surface is chemically reacted with a refractory metal halide to form an interfacial layer comprising a refractory metal nitride. The reactive gas is preferably titanium tetrachloride although it is contemplated that other refractory metal halide gases may be suitable. It is believed that the titanium tetrachloride reacts with the silicon nitride surface according to the following reaction.

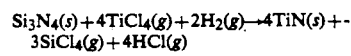

$$Si_3N_4(s) + 4TiCl_4(g) + 2H_2(g) \rightarrow 4TiN(s) + 3SiCl_4(g) + 4HCl(g)$$

The gaseous reaction mixture may also include an inert gas. The reaction gas is characterized by the absence of a carbon or nitrogen source which would preferentially react with the titanium chloride. Preferably the temperatures employed are from about 900 degrees centigrade to about 1600 degrees centigrade and preferably from about 1000 to about 1300 degrees centigrade.

The reaction is preferably carried out under suitable conditions so that substantially all the silicon nitride present at the surface reacts with the titanium chloride gas to form titanium nitride. The process of the present invention can be typically carried out in apparatus suited for typical vapor deposition reactions. The reactant gases are passed over a substrate in a reaction zone. The temperature of the reaction zone, and of the substrate surface, as well as the total flow and composition of the gas phase over the substrate are so selected as to allow the reaction between the gas and the substrate surface to proceed according to the thermodynamic principles. The total flow conditions and the total gas pressure are so selected as to allow the products of the reaction to be removed continuously from the reaction zone. The resulting coating is preferably uniform and homogeneous. The interfacial coating is preferably at least about one micron in thickness and more preferably from about 2 to about 5 microns in thickness. The interfacial coating may include some unreacted alpha-silicon nitride.

The substrate having the interfacial layer, may be conveniently coated with a refractory metal composition according to techniques known in the prior art. The layer of refractory material is selected from the group consisting of metal oxides such as aluminum oxide, refractory metal carbides, refractory metal nitrides, refractory metal carbonitrides, and/or combinations of the above.

EXAMPLE 4

Substrates as prepared in Examples 1 and 2, as well as commercial silicon nitride tools, are placed in a graphite resistance heated furnace at about 1200° C. A mixture of gases consisting of 4% titanium chloride 17%, hydrogen, and 79% argon is introduced into the furnace, and the reaction is allowed to occur for about one hour. The samples show the presence of a gold-colored deposit, about 1-3 microns in thickness. X-ray diffraction analysis of the coating shows that layer is titanium nitride.

Titanium carbide layers are formed on the silicon nitride substrate by passing titanium tetrachloride, a gaseous carbon source such as methane, and hydrogen over the substrate at a temperature of between about 800 degrees C. and 1500 degrees C. The reaction is described by the following equation, although hydrogen is often added to insure that the reaction takes place in a reducing environment.

$$TiCl_4 + CH_4 \rightarrow TiC + 4HCl$$

Substrate bodies having the layer of titanium nitride and titanium carbide may be coated with aluminum oxide by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in reducing atmosphere.

$$2AlCl_3 + 3H_2O \rightarrow Al_2O_3 + 6HCl$$

The substrate piece or pieces are heated to a temperature between about 800 degrees C. to about 1500 degrees C. and the gaseous mixture is passed over the heated substrate until the desired coating thickness is achieved.

Similarly, titanium nitride layers may be formed according to the following reaction.

$$2TiCl_4 + N_2 + 4H_2 \rightarrow 2TiN + 8HCl$$

Similarly, a layer of titanium carbonitride may be formed by a combination of the above reactions wherein both a carbon and nitrogen source are present in the reaction gases in a desired proportion. It is also contemplated that titanium in the above reactions may be substituted with a suitable refractory metal halide. Typical refractory metals include titanium, vanadium, chromium, zirconium, niobium, molybdenum, hafnium, tantalum and tungsten. Titanium and hafnium are preferred.

EXAMPLE 5

A portion of the coated substrate bodies as prepared in Example 5 are coated with titanium nitride at atmospheric pressure. A gaseous mixture consisting of 1.5% $TiCl_4$, 25% $N_2$ and 7.35% $H_2$ is passed over the substrate bodies at about 1025° C. for about 30 minutes. The samples show a gold-colored coating of TiN, about 2-4 microns thick.

EXAMPLE 6

A portion of the coated substrate bodies as prepared in Example 5 are coated with titanium carbide at atmospheric pressure. A gaseous mixture of 2.7% $TiCl_4$, 3.3% $CH_4$, 43% Ar and 51% $H_2$ is passed over the substrate bodies at a temperature of about 1100° C. for a period of about 1 hour. The resulting TiC coating is about 2-4 microns.

EXAMPLE 7

A portion of the substrate bodies as prepared in Example 6 are coated with aluminum oxide by passing a gaseous mixture of argon hydrogen, aluminum chloride, and carbon dioxide over a substrate at a temperature of 1000° C. The resulting aluminum oxide coating is about 1-2 microns thick.

EXAMPLE 8

Coated cutting tools according to examples given above were tested in the turning of AISI 4340 steel, as described in Example 3. The results are shown in Table II.

TABLE II

Comparison of performance of coated tools of present invention with commercial silicon nitride cutting tools.

| Tool Type | Coating Type | Tool life, min. | Failure Mode |
|---|---|---|---|
| Hot-pressed (Example 1) | Interlayer + TiC (Example 6) | 18.1 | Wear, no spalling of coating |
| O.P. Sintered (Example 2) | Interlayer + TiC (Example 6) | 15.1 | Wear, no spalling of coating |
| Commercial Sialon | Interlayer + TiC (Example 6) | 9.2 | Wear, no spalling of coating |
| Commercial Silcon Nitride | Interlayer + TiC (Example 6) | 0.7 | Wear, Extensive spalling of coating |
| Hot-pressed (Example 1) | Interlayer + TiC + $Al_2O_3$ (Example 7) | 6.5 | Chipping at no spalling of coating |
| O.P. Sintered (Example 2) | Interlayer + TiC + $Al_2O_3$ (Example 7) | 14.2 | Wear, no spalling of coating |
| Commercial Sialon | Interlayer + TiC + $Al_2O_3$ (Example 7) | 6.0 | Wear, no spalling of coating |
| Commercial Silicon Nitride | Interlayer + Tic + $Al_2O_3$ (Example 7) | 1.5 | Wear, some spalling of coating |

It is thus seen that the tools of the present invention have superior performance in the uncoated as well as coated conditions, as compared to the commercially available silicon nitride and sialon tools.

We claim:

1. A coated densified ceramic cutting tool comprising a substrate body having a granular phase consisting essentially of alpha silicon nitride and silicon aluminum oxynitride, said granular phase being uniformly distributed in a matrix of a suitable densification aid, said matrix including uniformly distributed submicron particles consisting essentially of titanium nitride, said silicon aluminum oxynitride and said titanium nitride being formed during densification of said tool by reaction of titanium oxide with a portion of said silicon nitride to form titanium nitride and silicon oxide, a layer of refractory material, and an interfacial layer intermediate said substrate and said layer of refractory material, said interfacial layer comprising a refractory metal chemically reacted to form a reaction bonded refractory metal nitride for enhancing the adherence of said layer of refractory metal material to said substrate.

2. A coated densified ceramic cutting tool according to claim 1 wherein said silicon aluminum oxynitride has the formula: $Si_{6-x}Al_xO_xN_{8-x}$ where x is greater than zero and less than or equal to 4.2.

3. A densified ceramic cutting tool according to claim 2 wherein x is from about 0.1 to about 2.0.

4. A coated densified cutting tool according to claim 1 where said refractory metal is titanium.

5. A coated densified cutting tool according to claim 4 wherein said layer of refractory material comprises at least one layer selected from the group consisting of refractory metal oxides, refractory metal carbides, refractory metal nitrides, or refractory metal carbonitrides and combinations thereof.

6. A coated densified cutting tool according to claim 5 wherein said layer of refractory material comprise titanium carbide.

7. A coated densified cutting tool according to claim 5 wherein said layer of refractory material comprises a layer of titanium carbide adjacent said interfacial layer and a layer of aluminum oxide adjacent said layer of titanium carbide.

* * * * *